United States Patent
Galstian et al.

(10) Patent No.: US 6,859,567 B2
(45) Date of Patent: Feb. 22, 2005

(54) IN-GUIDE CONTROL OF OPTICAL PROPAGATION

(75) Inventors: Tigran Galstian, Quebec (CA); Armen Zohrabyan, Quebec (CA); Dany Dumont, Quebec (CA); Amir Tork, Cap Rouge (CA); Rouslan Birabassov, Quebec (CA)

(73) Assignee: Photintech Inc., Ste-Foy (CA)

( * ) Notice: Subject to any disclaimer, the term of this patent is extended or adjusted under 35 U.S.C. 154(b) by 172 days.

(21) Appl. No.: 10/237,622

(22) Filed: Sep. 10, 2002

(65) Prior Publication Data

US 2003/0103708 A1 Jun. 5, 2003

Related U.S. Application Data

(60) Provisional application No. 60/334,118, filed on Nov. 30, 2001.

(51) Int. Cl.[7] .............................. G02B 1/101; G02F 1/01
(52) U.S. Cl. ............................................... 385/1; 385/39
(58) Field of Search .......................... 385/1–12, 14–16, 385/24, 27, 39

(56) References Cited

U.S. PATENT DOCUMENTS

| | | | |
|---|---|---|---|
| 4,474,427 A | 10/1984 | Hill et al. ................... | 350/96.3 |
| 5,007,705 A | 4/1991 | Morey et al. ............. | 350/96.29 |
| 5,444,723 A | 8/1995 | Chandonnet et al. ......... | 372/14 |
| 5,699,468 A | 12/1997 | Farries et al. ................ | 385/140 |
| 5,912,999 A | 6/1999 | Brennan et al. .............. | 385/37 |
| 5,963,291 A | 10/1999 | Wu et al. .................... | 349/196 |
| 5,966,493 A | 10/1999 | Wagoner et al. ............. | 385/140 |
| 6,011,881 A | 1/2000 | Moslehi et al. ............... | 385/10 |
| 6,058,226 A | 5/2000 | Starodubov ................... | 385/12 |
| 6,370,312 B1 | 4/2002 | Wagoner et al. ............. | 385/140 |
| 6,597,830 B1 * | 7/2003 | Nakabayashi et al. ........ | 385/24 |
| 2002/0181081 A1 * | 12/2002 | Myers et al. ............. | 359/341.1 |
| 2003/0002046 A1 * | 1/2003 | Myers et al. ................ | 356/459 |
| 2003/0002156 A1 * | 1/2003 | Hobbs et al. ................ | 359/573 |
| 2003/0035608 A1 * | 2/2003 | Zhang et al. .................. | 385/15 |
| 2003/0099019 A1 * | 5/2003 | Zhang et al. ................ | 359/161 |

* cited by examiner

*Primary Examiner*—Akm Enayet Ullah
(74) *Attorney, Agent, or Firm*—Kent Daniels; Ogilvy Renault

(57) ABSTRACT

We propose a dynamically tunable electro-optic cladding using our proprietary electro-optic material, applied to various circular and planar wave-guides along with specific electrode configuration and excitation electric field format appropriate to that material. Based on the evanescent field coupling phenomena, the proposed device may be used in variable optical attenuators, tunable filters and couplers, etc. Different design of applied electrodes and optical properties of controllable refractive index materials allow polarization dependent or independent, as well as direct or inverse operation regimes of proposed devices.

22 Claims, 11 Drawing Sheets

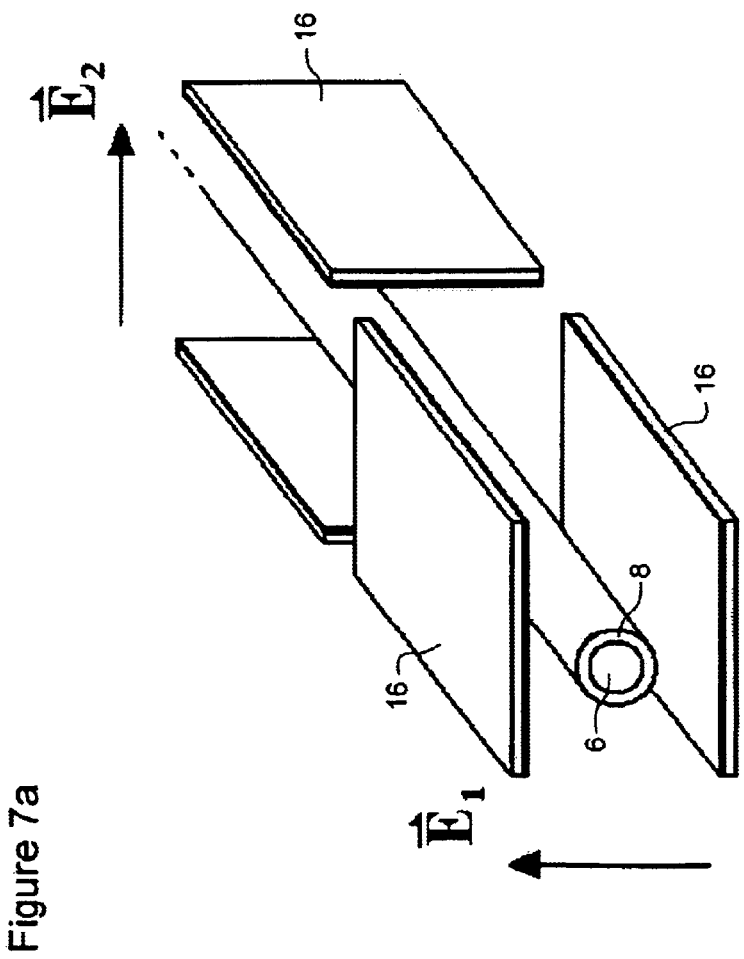
Figure 7a
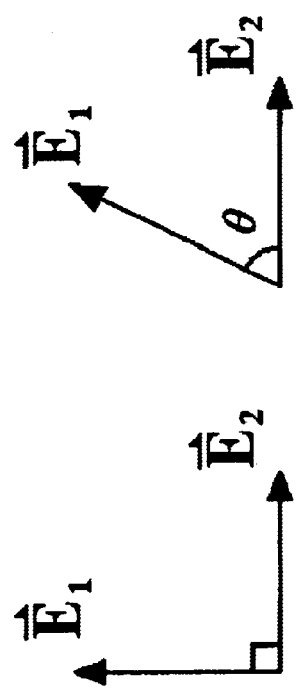
Figure 7b
Figure 7c

IN-GUIDE CONTROL OF OPTICAL PROPAGATION

CROSS-REFERENCE TO RELATED APPLICATIONS

This application based on, and claims benefit under 35 U.S.C.§119(e) of, U.S. Patent Application No. 60/334,118 filed Nov. 30, 2001.

MICROFICHE APPENDIX

Not Applicable.

TECHNICAL FIELD

The present invention relates to controllable optical devices, and in particular to controllable optical devices for controlling the propagation of light in an optical waveguide.

BACKGROUND OF THE INVENTION

As is well known in the art, the successful implementation of optical communications systems requires devices capable of reliably controlling the propagation of light. Basic optical processing functions required in optical communications include, but are not limited to: optical modulation (which includes amplification and attenuation of optical power); phase control (delay); and switching. In Wavelength Division Multiplexed (WDM) and Dense Wavelength Division Multiplexed (DWDM) communications systems, significant channel power imbalance may be generated and channel equalization become necessary where the above noted basic functions must be performed on a per-channel basis.

In modern high performance optical communications systems, data rates of 10 GHz or more can be encountered on each channel. In addition, using known optical amplification techniques such as Raman pumping and Erbium Doped Fiber Amplification (EDFA), optical transmission spans of 1000 Km or more can readily be achieved.

In general, there are two broad classes of known optical processing devices; namely Out-of-Fiber and In-Fiber. Out-of-Fiber devices typically involve extracting the light out of the transmission fiber and into a system of micro-optics. Within the micro-optical system, passive elements such as mirrors and lenses are combined with active elements such as liquid crystal arrays and/or Micro-Electro-Mechanical Systems (MEMS) to perform a wide range of sophisticated optical control functions. Light emerging from the micro-optical system is then coupled back into the transmission fiber to continue toward its destination.

Out-of-Fiber systems suffer numerous disadvantages, including difficulties manufacturing the micro-optical system components, stability of the system during service, and the high optical losses imposed by such systems. Losses are encountered within the micro-optical system, and more than 1 dB total loss will be encountered when coupling the light back into the transmission fiber. As a result, Out-of-Fiber systems typically require more optical amplifiers, which further increases the cost of the system.

In principle, many of the difficulties that are associated with Out-of-Fiber systems could be overcome by In-Fiber systems, in which light propagating within the fiber is controlled without removing the light from the fiber. One of the earliest In-Fiber systems involved optical amplification, in which stimulated Brillouin scattering is used to amplify optical signals propagating within a fiber. Other known devices utilize the reflective and transmissive properties of fiber Bragg gratings (FBG) and long period gratings (LPG), respectively, in the UV radiation sensitive core of fibers. See, for example, U.S. Pat. No. 4,474,427 (Hill et al.; U.S. Pat. No. 5,912,999 (Brennan et al.).

FBGs are spectral filters, which typically reflect light over a narrow wavelength range and transmit all other wavelengths. They also can be designed to have more complex spectral responses. Such filters were widely used in sensing and optical communications, such as add/drop filters, dispersion compensators, spectrum equalizers, etc.

Initially, FBG and LPG based devices were fabricated mainly for static operation. However, the performance of many optical components is frequently affected by environmental conditions and dynamic network configuration changes, and thus is strongly time varying. This requires the design and fabrication of dynamically controllable devices, especially wavelength selective components, such as tunable filters and variable attenuators. Some of the presently known solutions use FBGs and LPGs. For example, different ways have been proposed to dynamically change the resonant operation conditions of FBGs. These methods are based on the change of the effective refractive index of the core $$n_{\it eff}^{core}$$

or the geometrical period $\Lambda_{FBG}$ of the grating (the resonant Bragg reflection wavelength being $$\lambda_R = 2n_{\it eff}^{core}\Lambda_{FGB}$$

). The known methods use thermo-optic, piezoelectric, acousto-optic effects or fiber stressing mechanisms.

For example, U.S. Pat. No. 5,007,705 (Morey et al.) teaches a tunable FBG in which a heating electrode is used to change the geometrical period $\Lambda_{FBG}$ of the grating or the effective refractive index $$n_{\it eff}^{core}$$

of the core material. U.S. Pat. No. 5,699,468 (Farries et al) teaches a FBG based variable optical attenuator (filter) in which a piezo-electric transducer is coupled to each FBG. When a transducer is energized, it compresses or expands the respective grating, thereby changing the grating period and thus its reflection wavelength. Both of these devices are highly temperature sensitive and power consuming, both of which are undesirable, particularly in compact integrated geometries.

U.S. Pat. Nos. 5,966,493 and 6,370,312 (both to Wagoner et al.) teach tunable optical attenuators in which the cladding of an optical fiber is side-polished to expose a surface though which light propagating in the fiber core can escape. A controllable refractive index material is positioned against this surface. Changes in the effective refractive index of the controllable index material can be used to control the amount of light coupled out of the fiber core U.S. Pat. No. 6,011,881 (Moslehi et al.) teaches a tunable optical filter in which the cladding of an optical fiber is side-polished in the vicinity of a FBG. A controllable refractive index material is positioned against this surface. Changes in the refractive index of the controllable material can be used to vary the refractive index of the core material, and thus the reflective wavelength of the FBG. Because these devices require a side-polished fiber, the optical properties of which are also highly dependent on the radius of curvature and the distance between the polished surface and the fiber core, they tend to be difficult to manufacture. They also tend to be highly sensitive to temperature. Finally, because of the curvature and asymmetry of the side-polished fiber, its optical performance may be polarization dependent, which in many cases is undesirable.

There is a different situation (as compared to FBG) for LPG based tunable devices. In the case of LPG devices, light may be out-coupled from the fiber core and propagate in the cladding of the fiber, the properties of which are easier to change using an external controllable material. The resonant condition of light coupling between the core and the cladding is a function of the difference of the effective refractive index of the core mode $$n_{\mathit{eff}}^{\mathit{core}}$$

and the effective refractive indices of the cladding modes $$n_{\mathit{eff}}^{\mathit{clad}},$$

and also of the period of the LPG $\Lambda_{LPG}$:

$$\lambda_R = (n_{\mathit{eff}}^{\mathit{core}} - n_{\mathit{eff}}^{\mathit{clad}})\Lambda_{LPG}$$

Thus U.S. Pat. No. 6,058,226 (Starodubov) teaches an optical system for selectively filtering and modulating light extracted from the core to the cladding area by means of a LPG. This energy transfer is produced by a resonant (and thus wavelength-selective) mode coupling process between the co-propagating fundamental core and higher order cladding modes of the fiber. Different gratings and electrically driven elements can be combined to provide various types of filters, sensors, modulators and delay lines. The basic element of these different configurations is an electrically sensitive material which is disposed surrounding the cladding. The application (across the electrically sensitive material) of a voltage causes the refractive index of the material to change. This causes a change of the effective refractive index of the cladding $$n_{\mathit{eff}}^{\mathit{clad}},$$

which in turn influences the propagation characteristics of cladding modes. This in turn changes the resonant coupling condition between the cladding and fundamental core modes. Finally, as this process is wavelength sensitive, it changes the spectral transmittance characteristics of this LPG based device.

However, in contrast to FBG-based devices, the period $\Lambda_{LPG}$ and spectral bandwidth $\Delta\lambda_{LPG}$ of LPGs are typically very large (up to 1000 times larger than for narrowband FBG) and are not well adapted for narrow band (e.g., single WDM channel) applications. Note that Starodubov teaches a device in which a passive (non-tunable) FBG is used in combination with two tunable LPGs. Thus the electrical modulation (tuning) of the signal frequency still remains quasi broadband, since the radiation is extracted from the core by a quasi-broadband tunable LPG filter. In addition, several transfers are performed here between the core and the co-propagating cladding modes. Finally, Starodubov uses electrodes deposited directly on the cladding of the fiber since otherwise, the electrodes on opposed sides of the fiber would be too far apart (more than 125 μm), thereby requiring thus much higher voltages to induce refractive index changes. However, this solution also is very limited since it inevitably introduces losses of light because of the complex refractive index of the material forming the electrode. These conditions limit the application of that device as an efficient, low loss and narrowband-tuning element. At the same time, as mentioned above, the tunable FBG based filters could be useful for such applications. However, the thermal and mechanical methods, which affect the core zone of the fiber, are not efficient.

Accordingly, efficient In-Fiber optical devices remain highly desirable.

SUMMARY OF THE INVENTION

An object of the present invention is to provide a highly efficient optical device of In-Fiber control of optical propagation.

Accordingly, an aspect of the present invention provides an optical device for controlling propagation of light within an optical waveguide. The waveguide includes a core substantially axi-symmetrically surrounded by a cladding having a substantially fixed index of refraction. The optical device includes a control region in which a radial thickness of the cladding is less than a penetration depth of an evanescent field of light propagating in the waveguide core; a variable-index material surrounding the cladding at least within the tuning region; and a controller. The variable-index material has an index of refraction that is controllable in response to an applied stimulus. The controller is designed to controllably apply the stimulus to the variable-index material within the control region.

BRIEF DESCRIPTION OF THE DRAWINGS

Further features and advantages of the present invention will become apparent from the following detailed description, taken in combination with the appended drawings, in which:

FIGS. 7a–7c schematically illustrate operation of an embodiment of the invention utilizing two orthogonal pairs of electrodes positioned sequentially within the control region;

It will be noted that throughout the appended drawings, like features are identified by like reference numerals.

DETAILED DESCRIPTION OF THE PREFERRED EMBODIMENT

Figure 1:
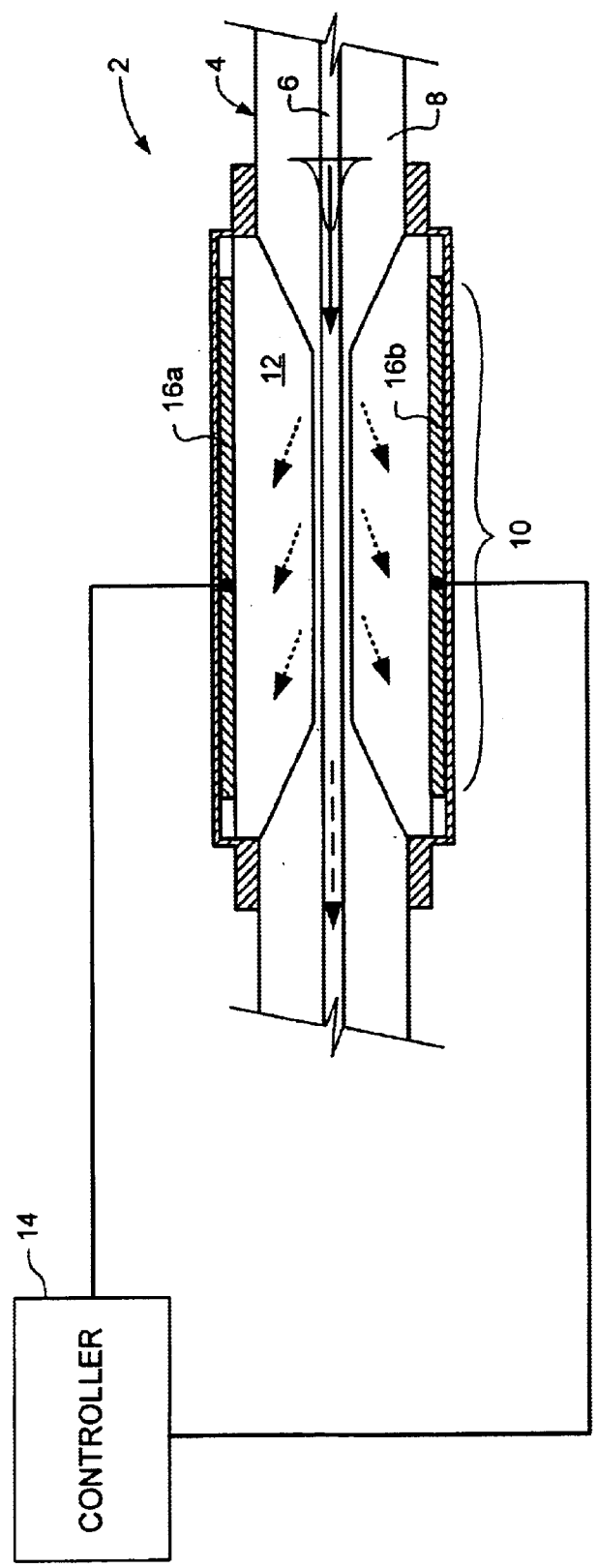
FIG. 1 shows a schematic illustration of an optical device in accordance with a first embodiment of the present invention.

The present invention provides an optical device designed to control propagation of light within the core of an optical waveguide, such as a fiber. Variants of the optical device may be used in optical communication systems as a tunable filter, optical attenuator, delay line etc. FIG. 1 schematically illustrates principle elements of an embodiment of the present invention.

As shown in FIG. 1, the optical device 2 generally comprises an optical waveguide 4 having a core 6 surrounded by a cladding 8 having a substantially fixed index of refraction. A control region 10 is formed in the waveguide 4, in which a radial thickness of the cladding 8 is reduced to less than the penetration depth of an evanescent field of light propagating in the waveguide core 6. A variable-index material 12 is disposed around the cladding 8 at least within the control region 10, and thus is capable of interaction with the evanescent field of light in the core 6. The variable-index material 12 has an index of refraction that is controllable in response to an applied stimulus. A controller 14 is arranged to controllably apply the stimulus to the variable-index material 12 within the control region.

Preferably, axial symmetry of the waveguide 4 is maintained throughout the length of the control region 10, so that the evanescent field of light within the core 6 can interact with the variable-index material 12 independently of its polarizations state. As will be described in greater detail below, this enables the optical device 2 to provide polarization-dependent and/or polarization-independent control functionality, as desired.

In the embodiment of FIG. 1, the core 6 is unmodified. In this case, controlling the index of refraction of the variable-index material 12 has the effect of controlling the coupling of light out of the core 6. This effect usually is not wavelength selective, at least within a few tens of nm, so the embodiment of FIG. 1 provides a broadband variable optical attenuator (VOA). If desired, the core can be modified by the introduction of transmissive LPGs and/or reflective FBGs, to provide more sophisticated functionality, as will be described in greater detail below.

Figure 2A:
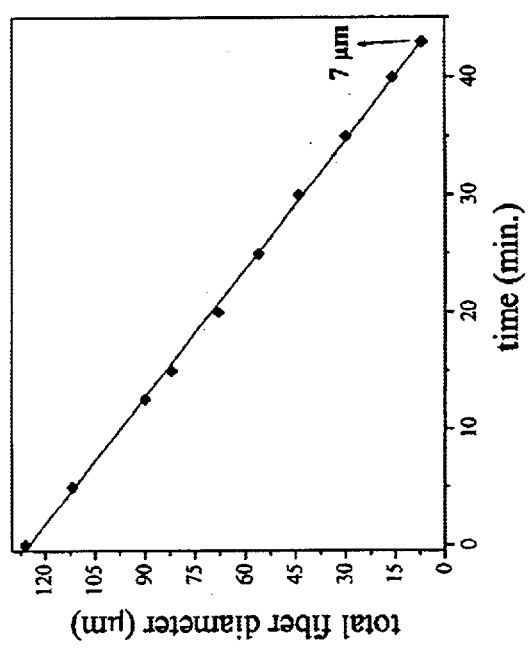
FIGS. 2a and 2b respectively show a graph illustrating a chemical etching process and a microphotograph of an etched fiber, usable in the present invention.
Figure 2B:
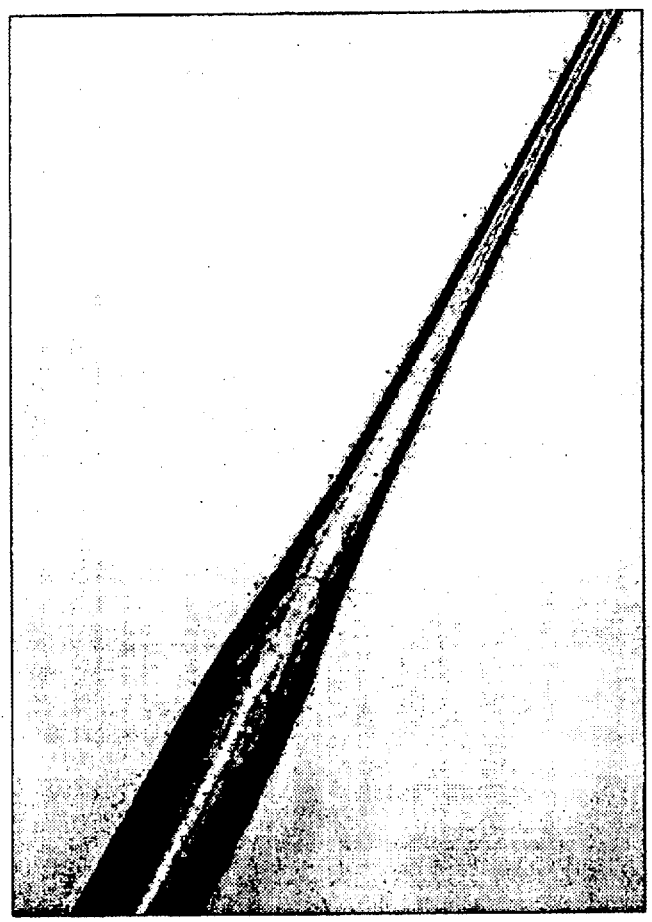

Various methods may be used to fabricate the control region 10 within a premanufactured waveguide, such as, for example, polishing or etching. Alternatively, the control region can be fabricated during manufacture of the waveguide cladding 8, in which case other known techniques may be more appropriate. In embodiments in which a conventional optical fiber is used as the waveguide 4, etching of the cladding 8 can advantageously be used to reduce the cladding thickness while preserving axial symmetry within the etched region of the fiber. As shown in FIG. 2a, the depth of chemical etching of an optical fiber using a hydrofluoric (HF) acid solution, is an approximately linear function of time. The rate of the chemical reaction depends primarily on the acid concentration and may be well controlled. Moreover, using masks, bent structures and/or selected time schedules, it is possible to construct non-uniform, periodic and quasi-periodic etched structures within the control region 10 of the waveguide. These structures can be used to generate desired spectral and polarization properties of the optical device. FIG. 2b shows a microphotograph of the transition zone of a typical etched fiber.

As may be appreciated, a variety of different variable-index materials may be utilized. In principle, any suitable thermo-optical, magneto-optical, and/or electro-optical materials that exhibit a change in refractive index in response to an applied stimulus may be used. However, the variable index material is preferably selected to also allow low energy consumption, fast response time, and easy controllability. Thus, for example, thermo-optical materials, in which the refractive index varies with temperature, are not preferred because they typically require high power consumption, slow response time (particularly for cooling), and thermally-induced dimensional changes in the waveguide material itself. As the modal behavior (field distribution, phase, etc.) within the fiber core is sensitive to the refractive index of the surrounding media, it is important to utilize a variable-index material having a respective refractive index that preferentially lies close to the refractive index of the cladding 8. A bent structure of the waveguide 4 may also be used to monitor the evanescent field penetration into the controllable material area.

Preferably, the variable index material 12 is either a composite liquid crystal (LC), or an electro-optical polymer. Both of these materials exhibit continuously variable index of refraction in response to an applied electric field. Because they are dielectrics, current flow is minimized (almost to zero) so that resistive heating (and thus undesired thermal effects) is virtually eliminated. Finally, the response time for these materials can be very fast, particularly for the electro-optical polymers. Composite polymer LC materials have advantages in that they are readily available at low cost, have understood optical properties, and their incorporation into practical devices can be readily accomplished. Electro-optical polymers, such as POLY (DR1-MMA) available from IBM, are advantageous in that they are solids at normal operating temperatures, which is particularly beneficial in the construction of integrated devices.

In embodiments utilizing electro-optical variable index materials 12 (e.g., LCs and electro-optical polymers), the index of refraction can be continuously controlled by means of an electric field applied to the variable-index material 12. Accordingly, as shown in FIG. 1, a pair of electrodes 16 can be disposed on opposite sides of the core 6, and coupled to the controller 14. Thus the controller 14 can apply a selected voltage difference to the opposed electrodes 16a,b to generate a desired electric field, which will be oriented transversely to the core 6. The separation distance between the electrodes can be less than 30 $\mu$m, so that required electric field strengths can be generated at comparatively low voltages.

Various well known methods may be used to fabricate the electrodes 16. For example, Indium Tin Oxide (ITO) electrodes can be formed in a glass or silicon substrate (not shown) using techniques well known in the art. Other metallic electrodes (e.g., of gold, silver or aluminum) can also be formed using known techniques, such as vapor deposition. Since transparency of the electrodes is often not required, bulk metallic electrodes may also be used.

Figure 3A:
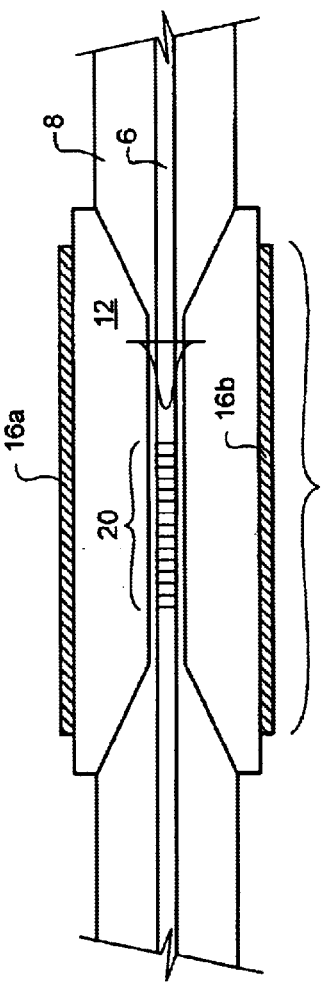
FIGS. 3a–3c schematically illustrate variations of the embodiment of FIG. 1.
Figure 3B:
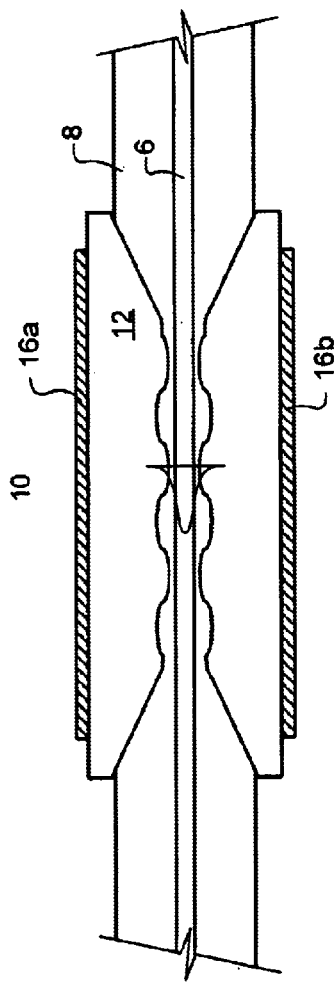
Figure 3C:
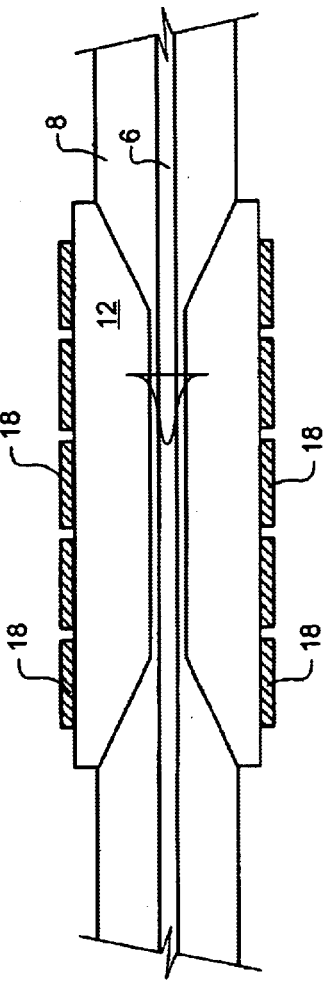

In the embodiment of FIG. 1, a single pair of electrodes 16 is shown spanning substantially the entire length of the control region 10. However, if desired, each electrode 16 may be divided into two or more electrode elements 18 (FIG. 3c), each of which may be independently controlled. If desired, electrode elements can be aligned with the core 6, or may be oriented at an angle to the core 6, as desired. FIGS. 3a–3c illustrate various features that may be incorporated (either alone or in combination) into the optical device, in order to achieve a desired optical performance characteristic.

Thus, FIG. 3a illustrates the embodiment of FIG. 1 with the addition of a Fiber Bragg Grating (FBG) 20 written into the core 6 using known techniques. Such an FBG may take the form of a periodic variation of the refractive index of the core 6, or may be more complex. The periodicity of the FBG may be constant, or may vary, as desired. Multiple FBGs may be used within the same control region, if desired, and may be associated with (that is, may lie within the electric field generated between) a common electrode pair, or respective different electrode pairs, as desired. In any case, variations in the refractive index of the variable index material surrounding the FBG will have the effect of changing the reflective wavelength of the FBG. Thus optical devices incorporating one or more FBGs will function as tunable narrow-band attenuators, add-drop filters, etc.

FIG. 3b illustrates an embodiment in which the process of etching the cladding has been controlled to produce a periodic variation of the cladding thickness along the length of the control region 10. Note that axial symmetry is maintained throughout the control region, even as the cladding thickness varies with longitudinal position.

FIG. 3c illustrates an embodiment in which multiple electrode elements 18 are arranged along the length of the control region. If desired, the electrode elements 18 can be independently controlled so that the index of refraction of the variable index material 12 can vary with longitudinal position within the control region 10.

As mentioned previously, LC materials are particularly useful for the present invention. LC materials are known to exhibit high electro-optic sensitivity and optical birefringence $\Delta n$ (up to 0.28) between ordinary and extraordinary refractive indices (denoted as $n_o$ and $n_e$, respectively). The refractive index "seen" by light incident on a LC material is a function of the angle between the polarization vector of the incident light and the local averaged direction of molecular long axes (commonly called the director). An important consideration is the initial alignment of the LC molecules at the interfaces defined by the cladding surface (within the control region) and the surrounding surfaces; that is, the electrodes 16, their supporting substrates and adjoining walls that contain the LC material. Depending on the desired initial (or relaxed-state) alignment, various techniques can be used to achieve the required anchoring conditions and LC alignment at the scale of the cell.

FIG. 4 shows different basic LC alignments at the cladding surface. FIG. 4a shows a planar homogenous alignment with the director pointing along the fiber axis. FIG. 4b shows a radial or homeotropic alignment. FIG. 4c shows a planar azimuthal alignment, and FIG. 4d shows a tilted alignment. Hybrid geometries may be obtained when the anchoring at various points or boundaries are different. For example, FIG. 4e illustrates a geometry in which different LC surface alignments are established at opposed cell surfaces. In this case, the director field can be non-uniform in space, as shown in FIG. 4e.

If desired, the director orientation may be constant throughout the length of the control region. However, different director orientations can be established along the length of the control region to obtain desired (e.g., polarization independent) properties of the optical device, as will be described in greater detail below.

The most frequently used technique for establishing the relaxed-state (i.e., with no applied electric field) director orientation is the unidirectional rubbing or photoexposition of a polymer film at the solid-LC interface. When applied to the cladding surface within the control region 10, this produces a uniform planar orientation as shown in FIG. 4a. Another common orientation geometry is the homogeneous alignment of the LC molecules perpendicular to the interface (see FIG. 4b). This texture is commonly called homeotropic and is achievable using surfactant materials doped in the LC or deposited on the cladding surface. Cetyl-Trimethyl-Ammonium-Bromide (CTAB) and lecithin are commonly used as surfactants for this purpose. Generally (with CTAB for example) nearly monomolecular layers are formed, and so this additional layer does not perturb the optical properties of the device. Truly monomolecular layers of molecules having long methylene chains are also a good technique to provide strong homeotropic alignment. These monolayers may be coated on the surface using, for example, the well known Langmuir-Blodgett or similar deposition techniques. One can also obtain the described textures by applying external electric or magnetic fields, if desired.

Figure 4C:
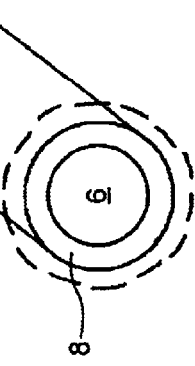
FIGS. 4a–e schematically illustrate different liquid crystal molecular orientations usable in the present invention.
Figure 4E:
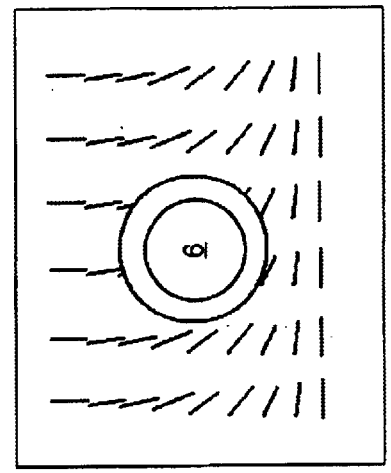
Figure 4B:
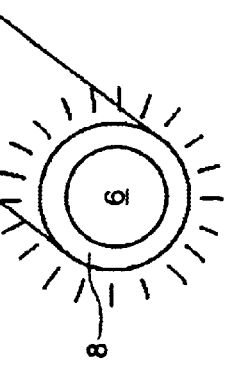
Figure 4A:
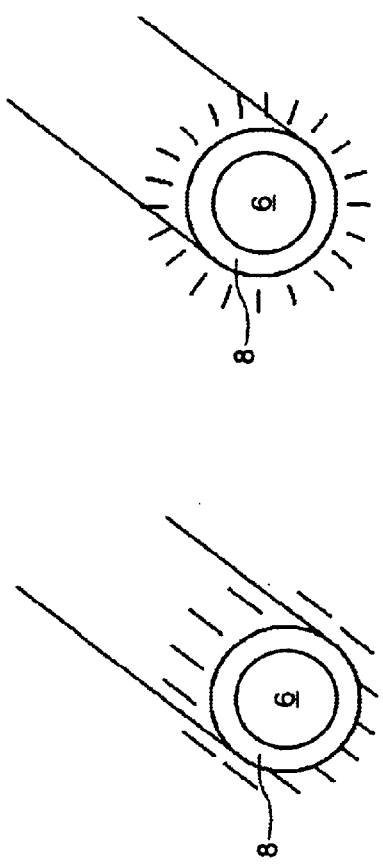
Figure 4D:
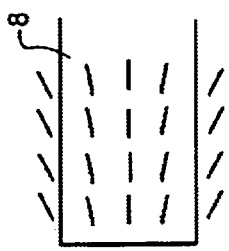

Another case is dealing with all possible tilted and hybrid alignments with respect to the interface plane (see FIGS. 4d and e). Many techniques can be used to obtain tilted polar anchoring, such as oblique evaporation of $SiO_2$ or $MgF_2$, relief gratings, pixilated electrodes, photo-induced anisotropy, etc.

For each initial director alignment, there is a corresponding refractive index profile with respect to the fiber core-modes. For example, the planar homogeneous orientation, when the director is pointing along the fiber axis (FIG. 4a) provides an isotropic and constant refractive index distribution.

Other techniques, such as the use of pixilated electrode arrays, photosensitive layers, light exposition, particle deposition or charged beam exposition, may also be used to achieve a desired director alignment. For example, an external magnetic field or a surface layer containing an oriented magnetic powder may be applied to achieve the desired local surface orientation. It should be noted that the discussed alignment techniques may be usable for both planar and cylindrical geometry waveguides.

Well known in the art alignment methods can provide high or low (approaching zero) interaction energy between LC molecules and an interface (e.g., cladding surface or electrode substrate surfaces) to obtain the desired, polar and azimuthal anchoring. Azimuthal anchoring with near zero interaction energy is achievable, for example, with fluorinated materials (like Teflon). Consequently, the required operating voltages are lower, and there is almost no threshold. Also, there is almost no significant radial dependence of the refractive index in the vicinity of the cladding surface. With this arrangement, crossed couples of electrodes (for example placed along the length of the control region) can be used to construct a rapid LC modulator. Threshold-free operation may be also achieved using pre-tilt angles on orienting surfaces, which in addition would accelerate the response of the device. In the particular case of cylindrical interface geometry (i.e., the fiber cladding surface), liquid crystals can naturally orient along the symmetry axis (longitudinal or z-axis of the waveguide) to minimize distortion energy or, in other words, to avoid bend, splay and saddle-splay deformations that "cost" more elastic energy than the uniform alignment. This has been experimentally observed by the inventors when no special surface treatments were made on an etched silica optical fiber.

As mentioned above, the general mode of operation of the optical device of the present invention is based on the application of an external stimulus such as an electric field, which results in the direct change of the refractive index of the variable-index material and consequently changes the effective refractive index "seen" by light propagating in the core. In the case of LC variable-index materials, this change may be accomplished via reorientation of the initial (relaxed-state) direction of the LC molecules with respect to the waveguide core. The selection of materials used, electrode geometry, gratings written to the wave guide core, and cladding contour (produced by controlled etching, for example) can be combined in various ways to construct a variety of different optical devices. In order to illustrate the versatility of the present invention, a selection of different devices are described below. It will be recognized that the described selection is in no way exhaustive, and therefore is not limitative of the scope of the appended claims.

Variable Optical Attenuator

Figure 6:
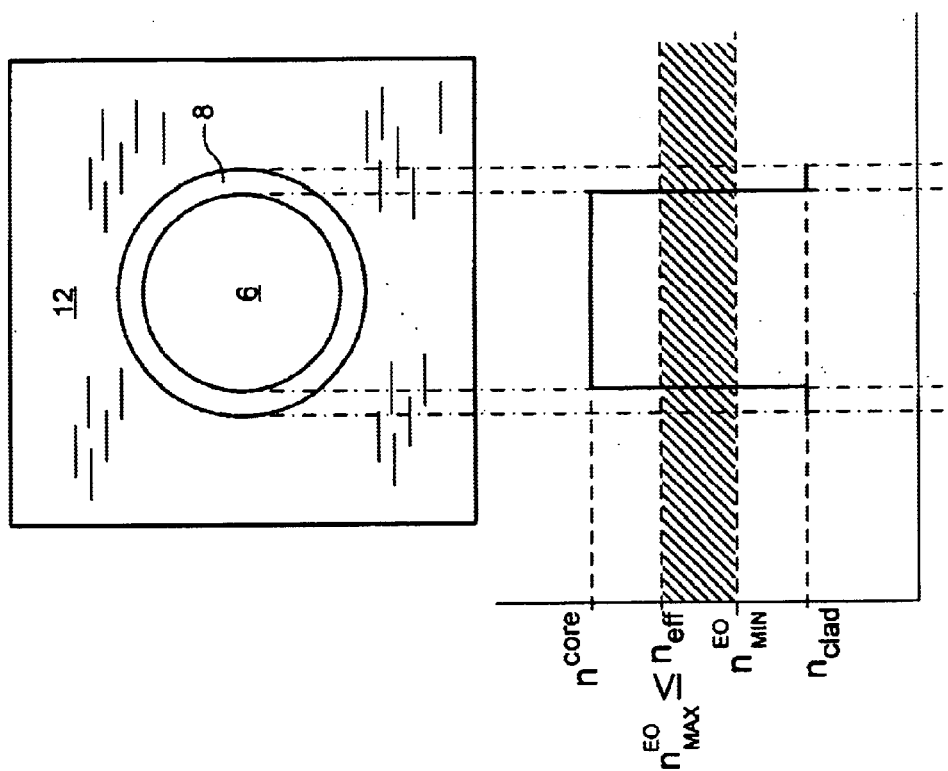
FIG. 6 is a schematic illustration showing operation of an embodiment of the present invention implemented as a variable phase delay and tunable filter.
Figure 5:
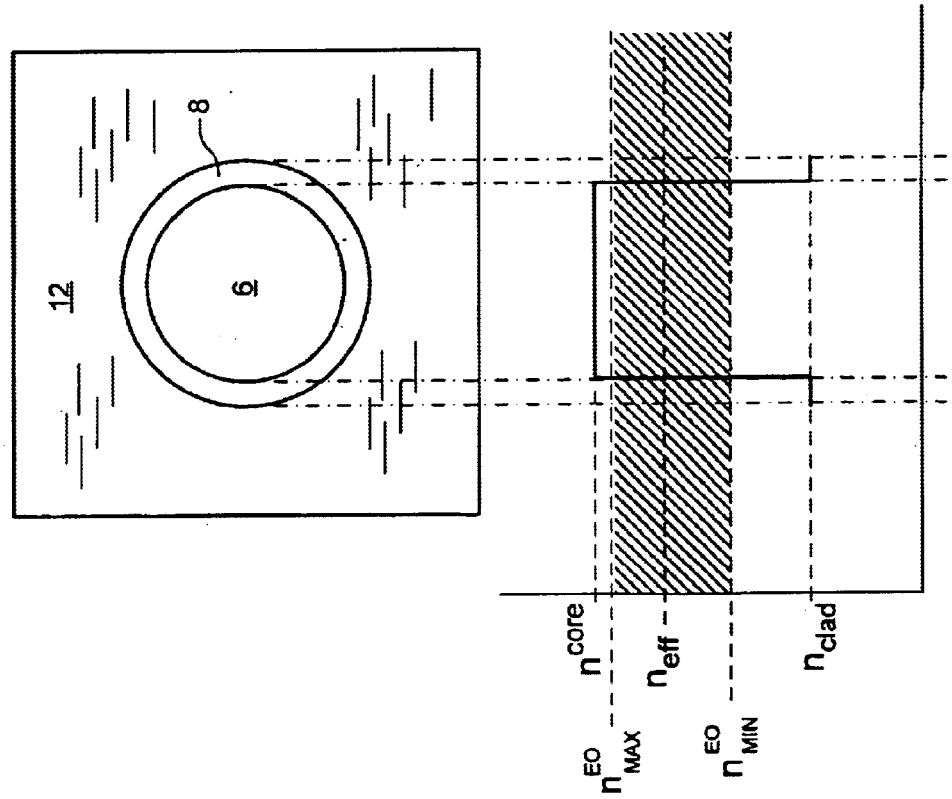
FIG. 5 is a schematic illustration showing operation of an embodiment of the present invention implemented as a variable optical attenuator.

FIG. 1 illustrates a basic embodiment of the present invention, which can be used to obtain broadband variable optical attenuation or phase delay. Variable optical attenuation is obtained by selecting and controlling the variable-index material such that the maximum and minimum refractive indices $$n^{EO}_{MAX}$$

and $$n^{EO}_{MIN}$$

of the variable index material (as seen by light propagating in the core) are respectively above and below the effective refractive index $n_{eff}$ of the core modes (which is generally slightly below the refractive index $n^{core}$ of the core). Conversely, variable phase delay is obtained by selecting and controlling the variable-index material such that the maximum achievable refractive index $$n^{EO}_{MAX}$$

of the variable index material is equal to or less than the effective refractive index $n_{eff}$ of the core modes. These modes of operation are illustrated in FIGS. 5 and 6, in which $n_{clad}$ is the refractive index of the cladding. Some commercially available optical fibers have $n^{core}=1.47$, and various values of $n_{clad}$ (below $n^{core}$) may be obtained by doping, implanting or deposition. At the same time, the present inventors have developed some composite polymer LC materials having refractive indexes which may be varied by an electric field from 1.42 to 1.75. It is therefore readily possible to control such an LC material to obtain the desired mode of operation. When the refractive index $n^{EO}$ of the variable index material is below the effective refractive index $n_{eff}$ of the core modes, refractive index changes will modify the effective refractive index of the core modes. Consequently the propagation constant of these modes will be changed, resulting in a phase delay that will be a function of the difference between $n^{EO}$ and $n_{eff}$. To the extent that refractive index is wavelength-dependent, the phase shift will also vary with wavelength.

As the refractive index $n^{EO}$ of the variable index material increases above $n_{eff}$, light will be coupled out of the core, resulting in attenuation of optical modes within the core. The amount of light coupled out of the core is a function of the difference between $n^{EO}$ and $n_{eff}$, and will vary with wavelength as described above in connection with variable phase delay. Thus broadband variable optical attenuation of core modes is achieved. The present inventors have experimentally obtained a 55 dB attenuation using an attenuator in accordance with the present invention. Note that either $$n^{EO}_{MAX}$$

and $$n^{EO}_{MIN}$$

may correspond to the relaxed-state of the LC variable-index material, so that direct or reverse modulation mode variable attenuations (described below) may be obtained, as desired.

Tunable Filter

A tunable reflection of light propagating in the core can be obtained from the device of FIG. 1, by adding a FBG to the waveguide core, and by choosing the variable-index material such that the maximum refractive index $$n^{EO}_{MAX}$$

of the variable index material (as seen by light propagating in the core) is below the effective refractive index $n_{eff}$ of the core modes. This mode of operation is illustrated in FIG. 6. As mentioned above, by keeping $$n^{EO}_{MAX} < n_{eff},$$

refractive index changes modify $n_{eff}$, resulting in changes of the propagation constant of these modes. This has the effect of varying the resonant (reflective) wavelength of the FBG within the core, thereby allowing the FBG to be tuned to a desired wavelength. This will happen without changing the geometrical period of the grating and without a change of the refractive index of the core material itself.

Consider a practical case in which $n_e$ and $n_o$ are respectively above and below the refractive index $n_{clad}$ of the cladding, that is, $n_e > n_{clad} > n_o$. Two key geometries will then allow us to demonstrate the principles of operation of the proposed devices. First, consider an LC cell which has surface treatments providing planar molecular orientation with the LC director parallel to the waveguide longitudinal axis (i.e., the z-axis, see FIG. 4a). In this case, both TE and TM fundamental modes within the waveguide core see an effective refractive index, which is mainly determined by the ordinary refractive index $n_o$ of the LC material. The application of an external field across the waveguide will result in the reorientation of LC molecules. The new orientation of the director will tend to be parallel with the applied field if the LC has positive dielectric $\Delta\epsilon>0$ (or magnetic $\Delta\mu>0$) anisotropy at the frequency of the electric (or magnetic) field used. In this case, one of polarization modes will see different (e.g., higher) effective refractive index of the LC material, which will consequently change its propagation constant. There will be no losses if the achieved refractive index $n^{EO}$ remains smaller than the effective refractive index $$n_{e\!f\!f}^{core}$$

of the core modes. In the case when $n^{EO}$ becomes higher than $$n_{e\!f\!f}^{core},$$

then we obtain a mode which is at least partially coupled out from the core, and thereby suffers controllable losses. At the same time, this device may have very low insertion loss (less than 0.1 dB) since the light remains within the core of the waveguide before the electric field is applied (when $$n_{e\!f\!f}^{core}$$

is higher than $n_o$).

Note that with only one electro-optic cell (with simple planar electrodes as shown in FIG. 1, the described modulation (attenuation, reflection or phase shift) is in general polarization dependent, which could be used to create electrically tunable polarizers and anisotropic phase delays. Thus a switchable fiber polarizer with 30 dB polarization extinction ratio has been demonstrated by the present inventors.

In some cases however, the polarization dependence may be an undesirable effect. It is then possible to make these elements polarization independent using multiple couples of electrodes that allow the application of orthogonal electric fields over many portions of the fiber. For example, one can use the electrode configurations shown in FIGS. 7 and 8, in which different electric fields $E_1$ and $E_2$ are applied along the length of the control zone. $E_1$ and $E_2$ may or may not be orthogonal, as desired. In principle, there is no limitation on the number and length of electrodes (or electrode elements) that can be positioned along the control region. Polarization independent operation can also be realized using LC cells with chiral contents or initial hybrid alignment (see below).

Thus, an embodiment of the present invention utilizes a relatively long FBG written into the core, with two mutually tilted (e.g., orthogonal) pairs of electrodes, which are sequentially positioned within the control zone, as shown in FIG. 7. This design allows each polarization mode of input light to be independently controlled.

Figure 8C:
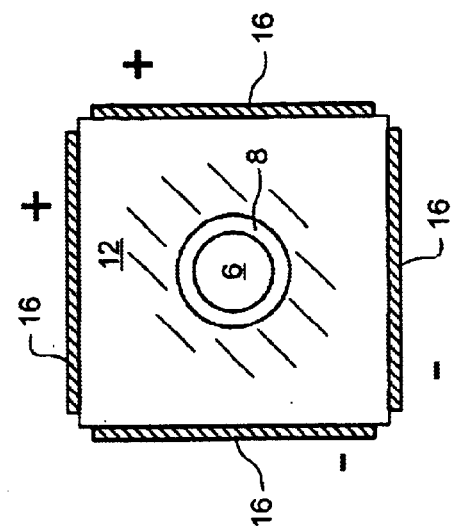
FIGS. 8a–8c schematically illustrate operation of an embodiment of the invention utilizing two longitudinally overlapping orthogonal pairs of electrodes positioned within the control region.
Figure 8B:
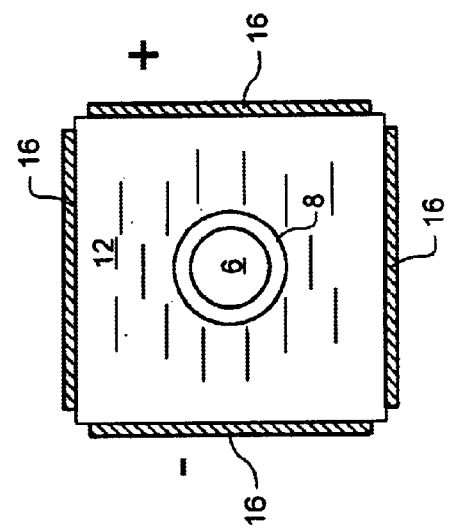
Figure 8A:
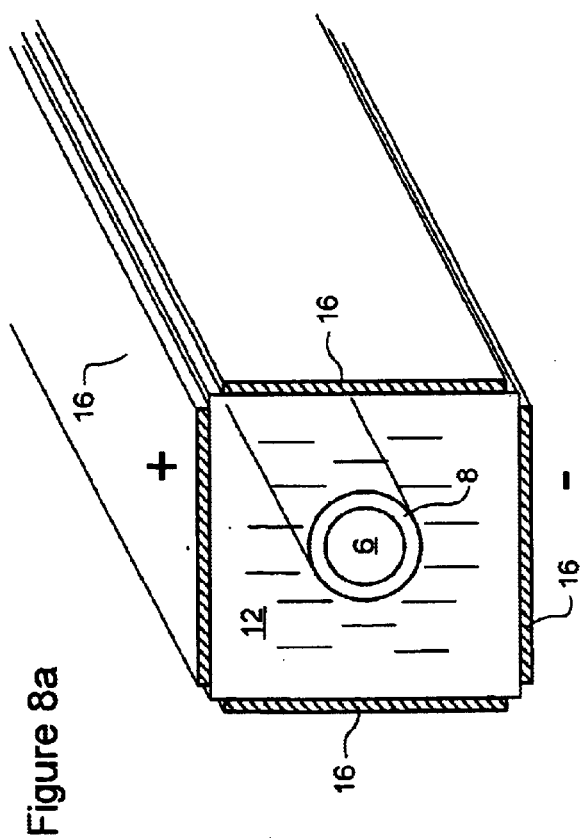

Another variation utilizes the overlapping (longitudinally) of two or more pairs of electrodes at respective different angular orientations, as shown in FIG. 8. This electrode geometry allows richer choices of the spatial form of the applied electric field via the switching on and off of different couples of electrodes (vertical, horizontal, tilted right, tilted left, etc.), and thus improved polarization manipulations.

The use of multiple overlapping electrode pairs allows the response time of the LC molecular reorientation to be significantly decreased by dynamically switching power between appropriate electrode pairs, as may be seen in FIG. 8. it is also possible to use an LC composition which has a dual-frequency operation, that is, positive and negative dielectric anisotropy $\Delta\epsilon$ at different driving frequencies (e.g., $\omega_1$ and $\omega_2$). Thus, the switch-off of the forward driving signal (at frequency $\omega_1$) and switch-on of the back driving signal (at frequency $\omega_2$) will accelerate the modulation cycle.

Figure 9:
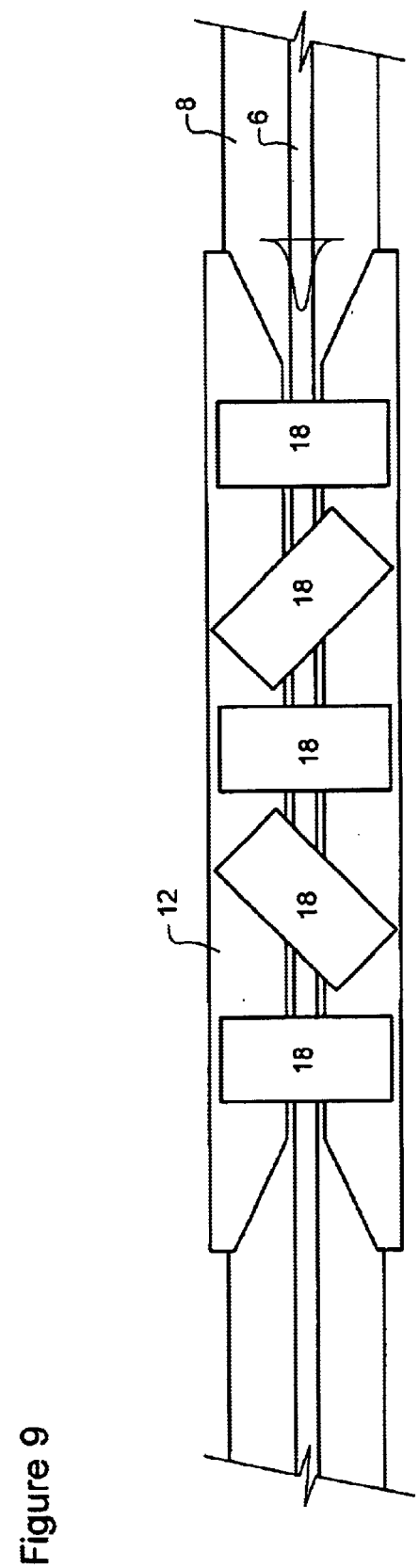
FIG. 9 schematically illustrates an embodiment in which multiple pairs of electrodes are positioned sequentially within the control region, with at least some electrode pairs being twist oriented at a skew angle relative to the previous pair of electrode.

Still another variation of the present invention may include helicoidal or spatially distributed pixilated and angularly spread (tilted in an optimal manner) individual electrode pairs (as is schematically shown in FIG. 9) arranged to have parallel (to the fiber) surfaces, but mutually twisted around the fiber to create a desired spatio-temporal distribution of the electric field with corresponding modulation of the effective refractive index. This would allow the creation and tuning of polarization properties of the device, such as polarization insensitive or highly sensitive operation, etc. Note that the application of twisted polarization maintaining fibers or helical-core fibers also may be used to improve the polarization properties of optical devices in accordance with the present invention, even where complex electrode configurations are not used.

Another configuration can use a twisted (along the guide axis) magnetic field, which introduces losses for both TE and TM modes. This may be achieved, for example, by means of an externally applied field or an orienting layer which contains periodically oriented magnetic powder entrained within a solid matrix. Then the switch to the transparent mode may be achieved by applying a stronger magnetic or electric field along the guide axis or simply removing the previous orienting field.

The polarization dependence of embodiments utilizing the LC director orientation of FIG. 4a, but with positive dielectric anisotropy $\Delta\epsilon>0$, can also be reduced if two or more mutually crossed and phase shifted oscillating electric field components are applied across the fiber. In this case, one can achieve an orientational transition from uniform planar (FIG. 4a) to uniform homeotropic (FIG. 4b) states (and vice versa). The same transition could also be achieved by applying a longitudinal field (along the fiber axis and initial director orientation) if the LC used has negative dielectric ($\Delta\epsilon<0$) or magnetic anisotropy (as described below).

In another geometry, an initial homeotropic orientation of the LC (FIG. 4b) can be used. In this case, both polarization modes will initially see the same average refractive index $n_{av}$ of the LC. They will suffer from losses if $n_{av}$ is higher than the $n_{eff}$ of the core $$(n_{e\!f\!f}^{core})$$

or acquire some phase delay if $$n_{av} < n_{e\!f\!f}^{core}.$$

The application of a transverse field will reorient the LC director as described above, thereby increasing the refractive index for the extraordinary mode and decreasing the refractive index for the ordinary mode (if $n_e>n_o$). These changes will generate leakage losses as soon as the refractive index $n^{EO}$ is larger than $$n_{eff}^{core}.$$

In a completely reoriented state, the fiber would attenuate the extraordinary mode $$(\text{if } n_{eff}^{core} < n_e)$$

and be transparent for the ordinary mode (if $$(\text{if } n_{eff}^{core} > n_o).$$

This polarization dependant operation can be avoided by applying an electric or magnetic field along the fiber axis (for the LC having positive dielectric anisotropy $\Delta\epsilon>0$). In this case, it is possible to obtain a transition from the state represented in FIG. 4b to the state represented in FIG. 4a. Note that in this geometry, the attenuation takes place when the applied voltage is zero. This reverse-mode functionality is important for protecting expensive optical devices (e.g., for detection, test and measurements) from optical power damage due to power supply and attenuator failure.

The above-mentioned operation modes may be changed using a material which has a negative dielectric anisotropy ($\Delta\epsilon<0$) at the external excitation frequency. In this case, application of the electric field will repulse the director from that field and align it in the perpendicular direction. In this way, some useful combinations can be created using various initial orientations, electrode forms and geometries, and LC materials with negative and positive dielectric anisotropy (e.g., at low or quasi-DC and high frequencies) and optical anisotropy values. For example, the application of two (or more) crossed fields, which are transverse (e.g., along y and x axes) with respect to the longitudinal axis of the waveguide and which are oscillating at an optimal frequency and relative phase shift, would force the LC director to be parallel along the z-axis producing again the same transition from that of FIG. 4b to that of FIG. 4a.

Another way to make the above described devices to be polarization insensitive is the use of a twisted (along the guide axis) and bent fibers (including polarization maintaining and helical-core fibers), which are placed in the simple electro-optic cell. The use of a depolarizer, placed at the entrance of the cell, can also make the operation polarization independent.

As mentioned above, it is possible also to use a hybrid LC alignment as shown in FIG. 4e. In this case (e.g., with $\Delta n>0$), when there is no electric field E, the attenuation of the vertical (in the figure) polarization component occurs mainly in the top portion of the LC cell (which has a homeotropic alignment), while the attenuation of the horizontal (in the figure) polarization component takes place in the bottom portion of the cell (having a planar alignment). The application of electric or magnetic fields along the waveguide axis will result in the reorientation of LC molecules along the fiber axis (for $\Delta\epsilon>0$) resulting in a reduction of the leakage losses if $$n_{eff}^{core} > n_o.$$

Note that this will affect both polarization modes eff approximately equally. The same switch may also be achieved using two or more phase-shifted across-fiber oscillating fields for $\Delta\epsilon<0$. Note that in this configuration we also have a reverse mode operation, when the attenuation takes place when the applied voltage is zero.

Optical devices constructed in accordance with the present invention should preferably have a fast response time and high dynamic range (modulation depth). In the present invention, the dynamic range depends on the length of the control region and the portion of the evanescent field of the core mode that penetrates into the variable-index material. The response time of a given electro-optic LC material, which is generally limited by the relaxation time (except the case of forced relaxation geometries), usually depends on the cell thickness (i.e., the distance between LC boundaries or electrodes). The distance between the fiber and the nearest point of an electrode surface should preferably be far enough to prevent the introduction of losses. Explicitly, to decrease the response time of the LC material in an electric field, it is necessary to have low viscosity $\gamma$, small reorientation scale, etc. Also, the response is faster for higher electric fields, so it is typically faster for higher attenuation values. In the case where low attenuation is needed while keeping a fast response, the above-described electrode configurations can be divided into multiple discrete electrode elements arranged along the length of the control region, and these electrode elements can be driven independently (either step-wise or continuously) over a limited range of relatively high voltage values. In the case of short and numerous pixilated electrodes, one can reach very low attenuation levels, which can be increased as desired by activating additional electrode elements. This multiple electrode configuration also contributes to reduced relaxation time, since the volume of reoriented LC molecules is smaller. As mentioned above, electrodes can be made in such a way as to create orthogonal fields in order to minimize the polarization dependent losses (PDL). The same configuration can also be used to achieve discrete phase tuning in the case where $$n^{EO} < n_{eff}^{core}.$$

Such pixilated electrodes may be positioned with relative (triple) spatial shifts in all x, y and z directions to generate orienting fields in 3D for excitation and also for forced relaxation applications.

Figure 10A:
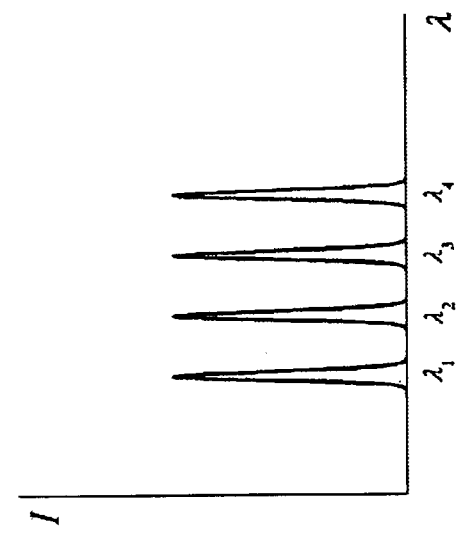
FIGS. 10a–10c schematically illustrate operation of an embodiment of the present invention implemented as a quasi-broad-band filter (channel equalizer)
Figure 10B:
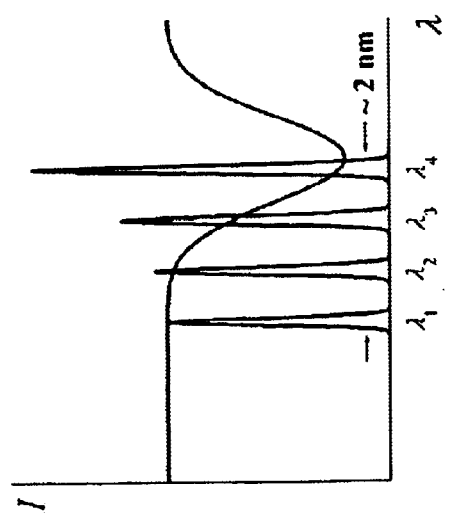
Figure 10C:
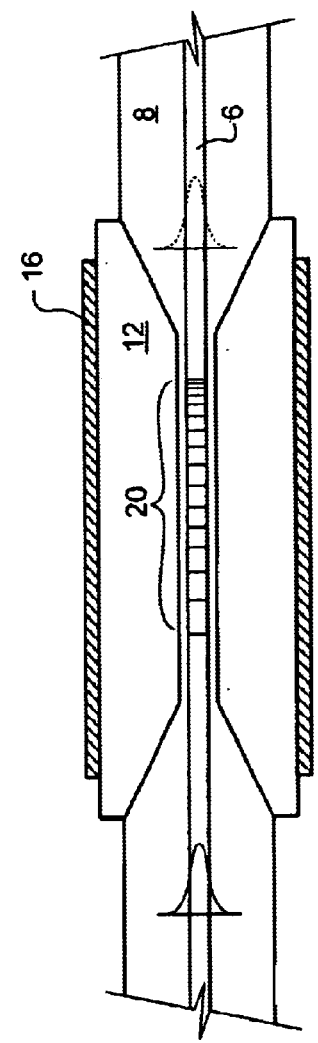

FIG. 10 illustrates operation of a tunable filter element as described above, deployed as a dynamic gain equalizer. FIG. 10a shows a reflective FBG's transmission curve superimposed over an example of the spectrum of four channels, at a position upstream of the tunable filter. FIG. 10b shows the channel spectrum after equalization by the filter. In this configuration, the FBG's transmission spectrum can be tuned (shifted) with respect to the channel spectum to obtain different levels of reflection and attenuation. It is possible also to use a chirped FBG 20 (see FIG. 10c) to obtain a comparatively broadband filter.

Figure 11B:
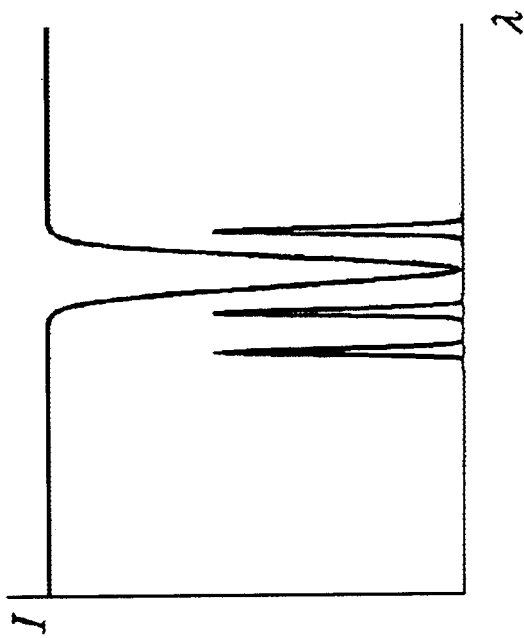
FIGS. 11a and 11b schematically illustrate operation of an embodiment of the present invention implemented as a narrow-band filter (add/drop filter)
Figure 11A:
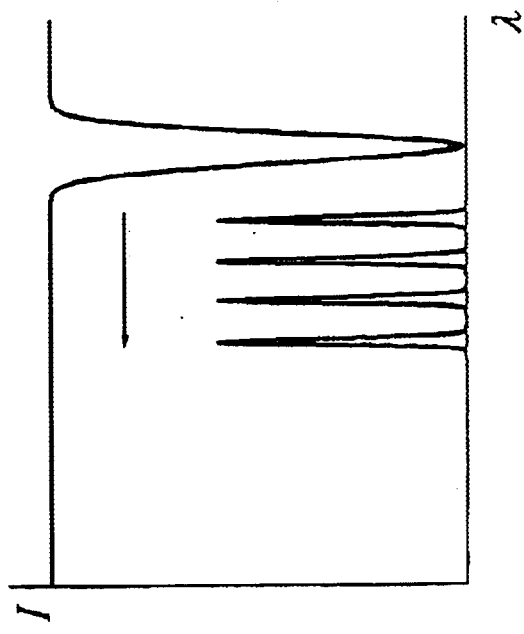
Figure 12:
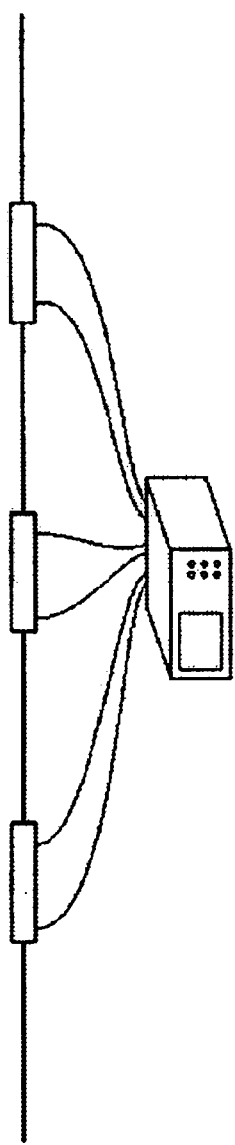
FIG. 12 illustrates a broad-band in-fiber optical processing system incorporating a plurality of optical devices in accordance with the present invention.

Another useful application of the present invention is the narrowband monitoring (attenuation or reflection, add or drop, etc.) of individual channels in WDM systems. In this case the transmission spectrum of the FBG used should preferably be not broader than the channel separation (typically on the order of 0.2–0.4 nm) As may be seen in FIG. 11, by means of tuning the resonant wavelength of the FBG (as describe above), it is possible to selectively modulate, add or drop selected individual channels. In FIG. 11, the dropped channel's wavelength is the second from the right side, which is resonant for FBG with corresponding applied voltage.

The above-described devices may use not only gratings recorded in the volume of the materials which compose the waveguide or the substrate, but also other kinds of gratings created, for example, within the cladding (see FIG. 3b) and/or the core of the waveguide. The refractive index of the variable-index material can also be tuned using other means such as temperature modulation, mechanical stress, external irradiation, etc.

An important application of proposed devices relates to the problem of multi-channel non-uniform amplified signal flattening or channel equilibration after add/drop filtering. This application is based on the combination of the above-described equalizer and/or basic narrowband devices, for in-line equalization of multi-channel amplified signals. In this scheme, multiple tunable elements are positioned sequentially along a fiber, as shown in. 12, each being designed to enable tuning across a respective range of wavelengths. With this sequential arrangement, it is possible to manipulate (e.g., equalize, etc.) the signals of individual channels across the full operating bandwidth of the optical signal traffic, by suitably tuning the relevant device.

Still in another embodiment of the present invention, it is possible to apply the same approach of evanescent field modulation to various kinds of arrayed fibers or integrated optics circuits, couplers, tapered fiber components, multiplexers and demultiplexers, to change the effective refractive index of the guiding part of these devices and to tune their operation conditions. An example of such a use is the tuning of the add/drop filters and the reconfiguring of arrayed waveguides. Thus an integrated arrayed waveguide device may be created, where the tuning of optical paths may be done using controllable material and correspondingly patterned electrodes (on the same guiding substrate or on an upper substrate to control each portion of the material separately by transverse or longitudinal fields, as described above). This allows the reconfiguration of the device via tuning of optical paths (when $n^{EO}<n_{eff}$) at each guiding channel separately while the use of variable optical attenuators (when $n^{EO}>n_{eff}$), which are preferably placed on already separated WDM channels would allow the monitoring of transmissions of separate channels. A combined operation (simultaneous phase and amplitude modulation) is also possible, via the crossing of the refractive index of the cladding layer by the refractive index of the controllable material.

There are many other applications of the present invention, which will be apparent to those skilled in the art.

Experimental Results

A Variable Optical Attenuator constructed as described above exhibited 55 dB attenuation using a 30V square-wave electric signal having a frequency of 1 kHz. The device had low insertion loss (<0.1 dB). The recorded rise and decay times were 10 ms and 100 ms respectively. A relatively low PDL of 0.28 dB was obtained using the above described multiple electrode structure.

The embodiment(s) of the invention described above is (are) intended to be exemplary only. The scope of the invention is therefore intended to be limited solely by the scope of the appended claims.

We claim:

1. An optical device for controlling propagation of light within an optical waveguide comprising a core substantially axi-symmetrically surrounded by a cladding having a substantially fixed index of refraction, the optical device comprising:

a control region of the optical waveguide in which a radial thickness of the cladding is less than a penetration depth of an evanescent field of light propagating in the waveguide core;

a variable-index material surrounding the cladding at least within the control region, the variable-index material having an index of refraction that is controllable in response to an applied stimulus; and a controller adapted to controllably apply the stimulus to the variable-index material within the control region.

2. An optical device as claimed in claim 1, wherein, at least within the control region of the optical waveguide, the thickness of the cladding is substantially uniform in a longitudinal direction of the waveguide.

3. An optical device as claimed in claim 1, wherein, at least within the control region of the optical waveguide, the thickness of the cladding varies with longitudinal position.

4. An optical device as claimed in claim 1, wherein the variable-index material comprises a liquid crystal material, and the stimulus comprises an electric field applied to the variable-index material substantially transversely to a longitudinal axis of the waveguide.

5. An optical device as claimed in claim 4, further comprising a surface treatment applied to an exterior surface of the cladding for defining a predetermined relaxed-state orientation of the liquid crystal in the absence of an electric field.

6. An optical device as claimed in claim 5, wherein the relaxed-state orientation comprises any one or more of:

a parallel orientation in which molecules of the liquid crystal lie substantially parallel to the longitudinal axis of the waveguide;

a radial orientation in which molecules of the liquid crystal lie substantially radially about the longitudinal axis of the waveguide;

a circumferential orientation in which molecules of the liquid crystal lie substantially circumferentially about the longitudinal axis of the waveguide; and a helical orientation, in which molecules of the liquid crystal lie in a substantially helical path about the longitudinal axis of the waveguide.

7. An optical device as claimed in claim 5, wherein the relaxed-state orientation is the same throughout the control portion.

8. An optical device as claimed in claim 5, wherein the relaxed-state orientation is different at respective different longitudinal positions within the control portion.

9. An optical device as claimed in claim 4, wherein the controller comprises at least two electrodes disposed substantially symmetrically about the waveguide and defining a predetermined energized-state orientation of the liquid crystal in accordance with an electric field between the electrodes, the energized-state orientation of the liquid crystal being at least partially transverse to the core of the waveguide.

10. An optical device as claimed in claim 9, wherein the at least two electrodes comprises a first pair of electrodes disposed on opposite sides of the waveguide core.

11. An optical device as claimed in claim 10, wherein the at least two electrodes comprises a second pair of electrodes disposed on opposite sides of the waveguide core, the second pair of electrodes being controllable independently of the first pair of electrodes, and being angularly separated from the first pair of electrodes.

12. An optical device as claimed in claim 9, wherein the electrodes are oriented substantially parallel to the core.

13. An optical device as claimed in claim 9, wherein the electrodes are oriented at an angle to the core.

14. An optical device as claimed in claim 9, wherein a length of the electrodes substantially corresponds with the length of the control portion.

15. An optical device as claimed in claim 14, wherein each electrode is electrically contiguous, such that a substantially uniform electric field is generated within the control portion.

16. An optical device as claimed in claim 14, wherein each electrode is divided into a plurality of independently controllable electrode elements, such that a varying electric field can be generated within the control portion.

17. An optical device as claimed in claim 1, wherein the variable-index material is a solid-state material.

18. An optical device as claimed in claim 17, wherein the solid-state material is a birefringent material having a principle axis.

19. An optical device as claimed in claim 18, wherein the birefringent material is divided into at least one axial segment within the control portion, the principle axis of the birefringent material of each segment being arranged in a selected one of a plurality of orientations relative to the longitudinal axis of the waveguide.

20. An optical device as claimed in claim 19, wherein the plurality of orientations comprises:
   a parallel orientation in which the principle axis lies substantially parallel to the longitudinal axis;
   transverse orientation in which the principle axis lies substantially transverse to the longitudinal axis;
   angled orientation in which the principle axis lies at an angle relative to the longitudinal axis; and
   a helical orientation in which the principle axis follows a substantially helical path about the longitudinal axis.

21. An optical device as claimed in claim 19, wherein the selected orientation of the principle axis of the birefringent material is the same in each segment.

22. An optical device as claimed in claim 19, wherein the selected orientation of the principle axis of the birefringent material in one segment is different from that of at least one other segment.

* * * * *